June 28, 1955  R. LIVINGSTONE  2,712,041

CARBON HOLDERS OR SHOES FOR ELECTRIC CURRENT COLLECTORS

Filed May 22, 1952  2 Sheets-Sheet 1

INVENTOR
ROBERT LIVINGSTONE

BY
Emory L. Groff
ATTORNEY

June 28, 1955   R. LIVINGSTONE   2,712,041
CARBON HOLDERS OR SHOES FOR ELECTRIC CURRENT COLLECTORS
Filed May 22, 1952   2 Sheets-Sheet 2

INVENTOR
ROBERT LIVINGSTONE
BY
Emory L. Groff
ATTORNEY

United States Patent Office 2,712,041
Patented June 28, 1955

2,712,041

CARBON HOLDERS OR SHOES FOR ELECTRIC CURRENT COLLECTORS

Robert Livingstone, Maidenhead, England

Application May 22, 1952, Serial No. 289,409

3 Claims. (Cl. 191—59.1)

This invention relates to renewable insert holders or shoes for electric current collectors for collecting current from an electric conductor by a moving vehicle and is concerned with holders or shoes of the knd wherein a renewable insert is employed. The insert is usually of a carbon compound.

In some known constructions the insert or carbon is slid into a longitudinal U-shaped slot in the shoe without side clamping, and a stop is screwed to the open end of the slot and keeps the insert in place. In this construction the insert has only a sliding contact with the shoe, on the sides and on the bottom.

In another known construction the shoe is open at the bottom to receive the insert and slit at one end so that the insert is clamped at the sides by a screw which tightens one end of the carbon holder. In this construction a shaped insert is used to obtain uniform side pressure.

In still another known construction the shoe is provided with a side clamping plate which is fastened to the shoe by screws or bolts, the bottom of the shoe is open, and the insert projects slightly and is drawn into contact with a table forming part of the trolley collector by additional screws and in some cases with a wedging action.

The advantage of these last two constructions is the good contact obtained both on the sides and bottom of the insert, and the support given to the insert by the side contact pressure. Hitherto some of these advantages have been offset by the necessity to keep the clamping screws, for either the end of a shoe slotted at one end, or the screws for a side clamping plate, below the level of a worn out insert, the necessity of removing small screws completely for the insertion of a new insert, or the use of an insert of special shape which cannot be produced by the relatively inexpensive extrusion process.

If the side clamping pressure on the insert is too near the bottom edge, the upper surface is subjected to a tension stress and the insert is liable to crack longitudinally, and an increase in pressure increases this tendency.

In the maintenance of electric vehicles it is a disadvantage to remove screws completely for the purpose of renewing the insert, and it is more economical to use an insert with the same cross sectional dimensions throughout its length, as this can be produced by the extrusion process.

The object of the invention is to provide an improved insert holder or shoe which combines the advantages of good electrical contact on both sides and bottom, protection of the insert, and ease of renewal with an insert of uniform section.

According to the present invention, there is provided an insert holder or shoe for current collectors for moving vehicles which comprises a side clamping plate and means for applying a substantially uniform clamping pressure between the contact faces of the clamping plate and the insert.

In order that the invention may be clearly understood and readily carried into effect, reference will now be made to the accompanying drawings which illustrate a preferred form of the invention by way of example. In the drawings.

Figure 1:
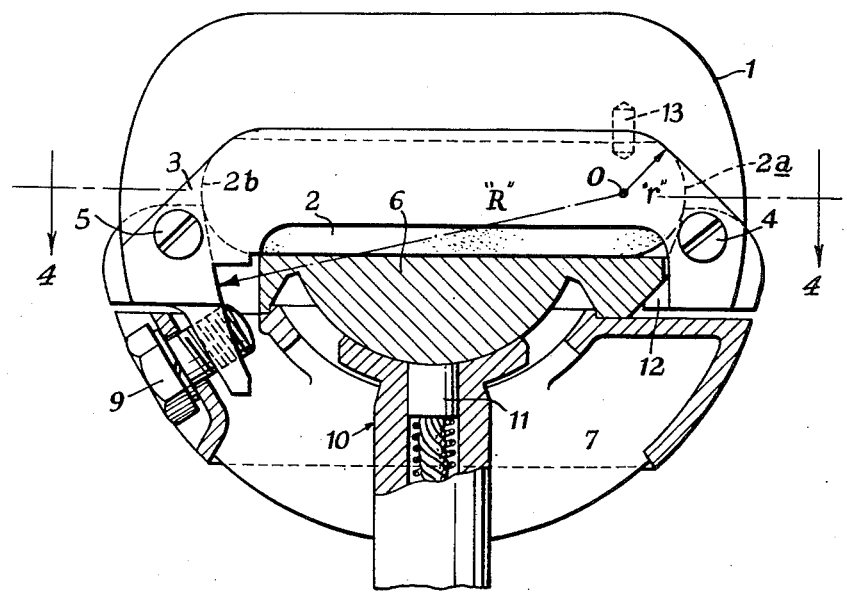
Figure 1 is a side elevation of the holder, side clamping plate and renewable insert assembled on part of a current collector which is shown in part section.
Figure 3:
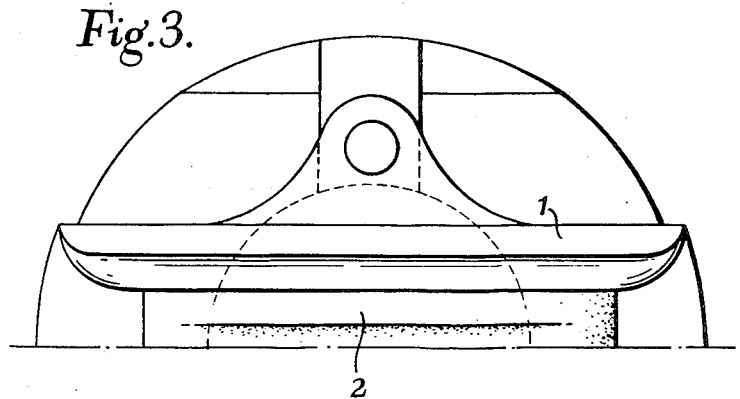
Figure 3 is a half plan view of Figure 1.
Figure 2:
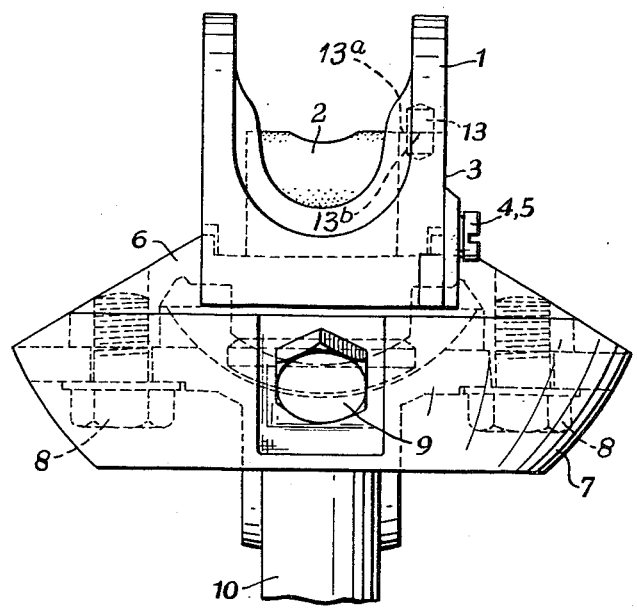
Figure 2 is an end elevation of Figure 1.

Referring to the drawings the insert holder 1 is of the type which is open at the bottom so that the renewable insert 2 projects slightly through the underside of the holder 1 in order to make contact with a table 6 which is part of the collector. A side clamping plate 3 for the insert 2 is used with means to apply lateral pressure at the top to protect the insert and give additional electrical contact.

Clamping screws or bolts 4 and 5 are provided at both ends of the clamping plate 3 to attach the plate to the shoe body and to clamp the plate against the longitudinal side face of the insert 2. These screws are normally situated below the depth of a worn out insert at each end of the side plate.

The holder, insert and clamping plate assembly is clamped to the table 6 by a fixing screw 9 and dovetail fastening 12.

The underside of the insert 2 is pulled into contact with the table 6 when the screw 9 is tightened.

The underside of the table 6 forms a semi-spherical bearing which rests in the spindle 10 with the centre from which the sphere is generated located above the table.

A central spring shunt 11 provides a path for the current from the table 6 to the spindle 10 at such times as the contact through the semi-spherical bearing is imperfect.

The table 6 is bolted to the casting 7 by screws 8 and forms the retaining cap for the semi-spherical bearing, limits oscillation of the shoe to a vertical plane containing the trolley wire and provides a shoulder for the screw 9.

Figure 4:
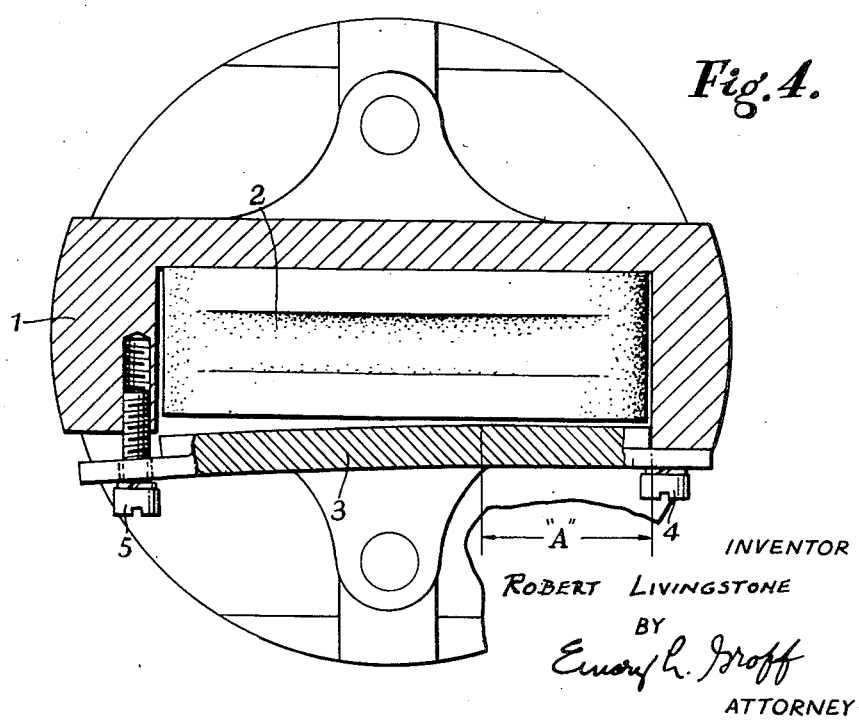
Figure 4 is a horizontal section through the holder and showing the clamping plate in plan view on section line 4—4 of Fig. 1.

The clamping plate 3 shown in Figure 4 is curved as shown and is attached firmly to the holder 1 by the screw 4.

The projecting part of the side plate 3 which makes contact with the insert 2 is reduced in thickness over the length "A" so as to be clear of the insert 2 whereas the thickness of projection over the remaining length is made sufficient to ensure contact with the insert 2 when screw 5 is tightened, although clear of the insert when screw 5 is undone, the radius of curvature of the clamping plate being kept large enough to avoid overstrain of the material when screw 5 is tightened.

A dowel 13 can also be used to assist screw 4 in keeping one end of the side plate 3 rigid. For example, the dowel 13, see Figure 1, engages in sockets formed in the adjacent edges 13ª and 13ᵇ of the holder 1 and the side plate 3, respectively, at one end in a position near the fastener 4 to prevent twisting of the plate 3. Thus the side plate 3 itself is formed into a spring by "setting" it to a predetermined curvature over its length. When the end 2b of the insert 2 is clamped by the bolt or screw 5 at that end, the side plate 3 is pulled into contact with the insert 2 over the greater part of its length and as the side plate 3 is prevented from twisting by the coaction of the first mentioned bolt 4 and the dowel 13 and a practically uniform pressure is applied to the insert 2.

To ensure that the plate is prevented from twisting, the fixed end can be brazed or soldered to the holder at the top of the plate, instead of being dowelled.

The side plate 3 can also be made so that both ends bolt up solidly to the holder and pressure on the insert is given on the middle part of the same by the spring action of the curved plate.

The pocket in the holder 1 for the insert 2 is made with a small radius shown as "$r$" in Figure 1 and the end 2a of the insert made with a corresponding radius.

At the other end 2b of the insert the pocket is made with the large radius "$R$" in Figure 1 from the common centre "O" for the two radii.

When the holder 1 is removed from the table 6 after removing screw 9, and screw 5 has been loosened, the insert 2 can swing up about centre "O" and be removed from the holder. A new insert can then be inserted, swung up into position, screw 5 tightened and the holder replaced on table 6.

The complete holder and insert must of course be mounted correctly on a suitable design of current collector to operate satisfactorily.

An application of the present invention which is envisaged is its use in conjunction with a current collector as described in British patent specifications Nos. 508,686, 513,889, and 525,872 in which the centre of oscillation of the insert holder is at or near to the rubbing surface of the insert, the longitudinal centre of the insert is displaced ahead in a forward direction of motion of the centre of oscillation and with features generally described in these specifications.

What we claim is:

1. An insert holder formed with a pocket having a seating surface, a carbon insert having a surface engageable with said seating surface for current collectors for moving vehicles, comprising, a side clamping plate shaped to form a spring clamp for applying a substantially uniform clamping pressure against the contacted face of the insert, to thereby bias said insert against said seating surface fastening means for said clamping plate, whereby said plate is fastened at one end to the holder clear of the insert so that the plate cannot twist, and a clamping bolt at the other end adapted to draw said plate into contact with the insert, the said plate having a part of its length of reduced thickness and radius at the end where it is fastened to the holder so as to be out of contact with the insert and the remaining part made of slightly greater thickness and radius, to thereby insure contact with the insert when said clamping bolt at the other end is tightened.

2. The insert holder according to claim 1, wherein said fastening means includes a dowel in combination with a securing bolt whereby said clamp is secured at two spaced points to prevent the twisting of said plate.

3. An insert holder according to claim 1, wherein one end of an insert in the holder and said adjacent end of the holder are formed with a small radius, and the other end of the holder is formed with a large radius from the same center so that said insert can swing about this center for removal when the clamping bolt is slackened.

References Cited in the file of this patent

UNITED STATES PATENTS

| | | |
|---|---|---|
| 1,416,152 | Woodings | May 16, 1922 |
| 1,487,617 | Stoppenbach | Mar. 18, 1924 |
| 1,530,174 | Hart | Mar. 17, 1925 |
| 1,867,130 | Alsaker | July 12, 1932 |
| 2,185,268 | Ryan | Jan. 2, 1940 |
| 2,185,269 | Ryan | Jan. 2, 1940 |
| 2,253,550 | Bohn | Aug. 26, 1941 |

FOREIGN PATENTS

| | | |
|---|---|---|
| 465,088 | Great Britain | Apr. 30, 1937 |